I. C. LEWIS.
TRAP NEST.
APPLICATION FILED APR. 15, 1916.
1,199,473.
Patented Sept. 26, 1916.
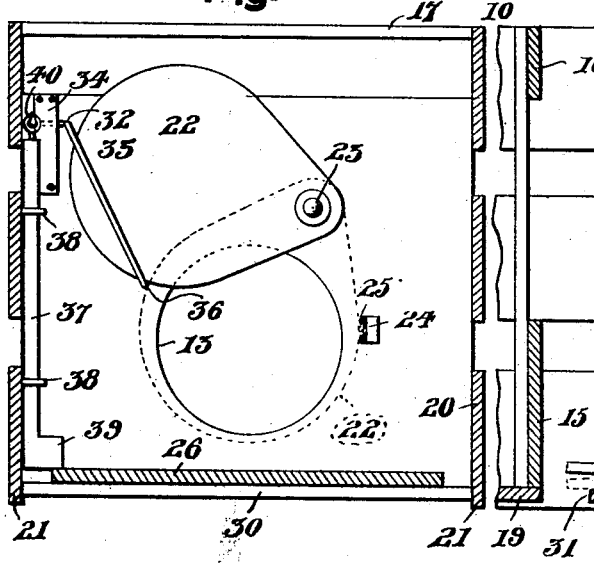
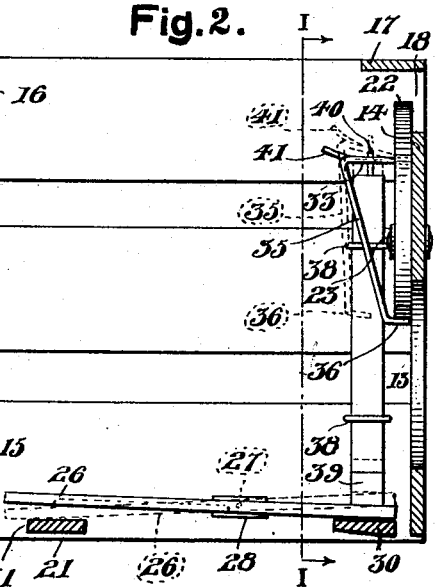
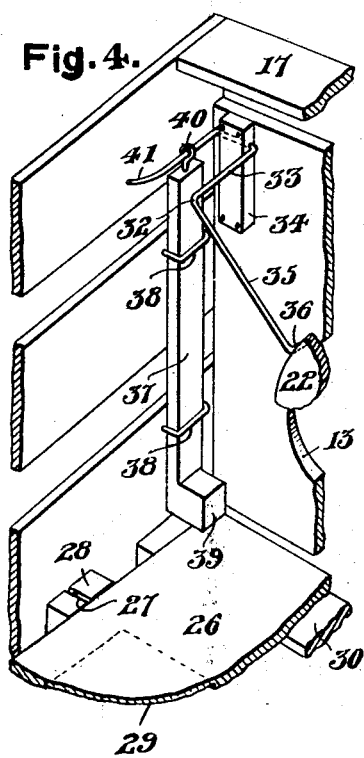
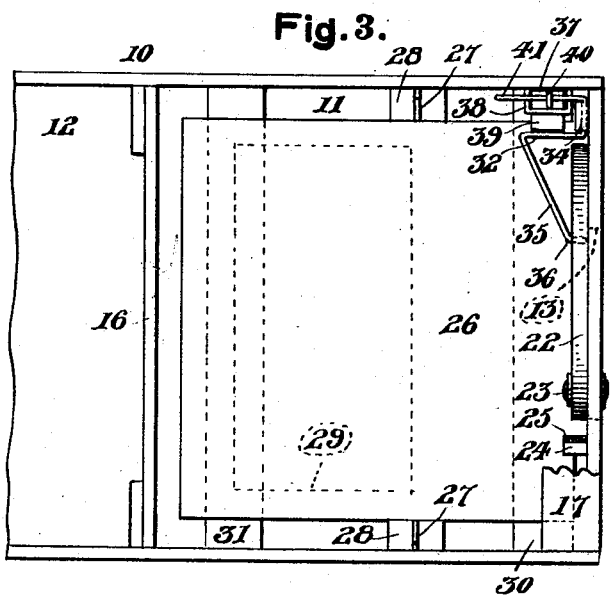
Inventor
Irving C. Lewis
By T. W. Bryant
Attorney

UNITED STATES PATENT OFFICE.

IRVING C. LEWIS, OF ULYSSES, PENNSYLVANIA.

TRAP-NEST.

1,199,473.   Specification of Letters Patent.   Patented Sept. 26, 1916.

Application filed April 15, 1916. Serial No. 91,348.

*To all whom it may concern:*

Be it known that I, IRVING C. LEWIS, a citizen of the United States of America, residing at Ulysses, in the county of Potter and State of Pennsylvania, have invented certain new and useful Improvements in Trap-Nests, of which the following is a specification.

This invention relates to certain new and useful improvements in trap nests.

The primary object of the invention is the provision of a device especially adapted for employment upon poultry farms designed for the purpose of accurately ascertaining the number of eggs which are laid by individual hens during a given period.

The invention contemplates a trapping device in which it is impossible for more than a single hen to enter the nest at the same time and one in which the catching mechanism is impossible of operation exteriorly of the device.

A further object of the device is to provide a trap nest structure which cannot be sprung and closed except upon the entry of a hen thereinto, the closing operation of the trap taking place while the entering hen is partially obstructingly positioned within door-way of the nest.

A still further object is to provide a trap nest that is easy and inexpensive to manufacture and by means of which an accurate laying record may be procured with a small amount of repair on the part of the attendant, the structure allowing free visual access at all times to the nest interior.

With these general objects in view and others that will appear as the nature of the invention is better understood, the same consists in the novel construction, combination and arrangment of parts hereinafter more fully described, illustrated in the accompanying drawings, and then claimed.

In the accompanying drawings forming a part of this application and in which like designating characters refer to corresponding parts throughout the several views:—

Figure 1 is a transverse sectional view through the device taken upon line I—I of Fig. 2. Fig. 2 is a longitudinal sectional view thereof with the rear or nesting portion broken away. Fig. 3 is a top plan view of the same, the trap being shown in its set position, and Fig. 4 is a detail interior perspective view of a forward corner portion thereof showing a small portion of the door in its locked closed position.

The present device consists of an elongated open topped crate formed of a double nest 10 having a forward waiting section 11 and a rear nesting section 12 while a circular entrance opening 13 of sufficient size to receive a hen is provided in the front wall or end of the waiting section 11. The entire device as well as the entrance door-way 13 is of predetermined dimensions governed by the size or breed of the fowls to be accommodated thereby. The waiting and nesting sections are separated by means of a base board 15 and a top cross piece 16 which latter is employable as a handle for readily carrying the device, it being understood that the said sections 11 and 12 are preferably arranged of substantially the same dimensions. A transverse cleat 17 is arranged at the top of the device transversely thereof and spaced from the upper edge of the front wall 14 leaving a window space 18 whereby the entire interior of the trap is readily viewable forwardly thereof, it being understood that the device is adapted to be arranged beneath a shelf or dropping board or to be provided with any manner of removable cover for preventing the escape of the fowl after being trapped therein as well as preventing hens from entering the device through the open top thereof.

The nesting section 12 is arranged with a floor or bottom 19 slightly spaced above the lower edges of the opposite lower side boards 20 of the device, such projecting lower edge portions 21 thereof forming runners by means of which the trap nest is inserted and removed from beneath the trapping boards or otherwise readily positioned as may be found desirable. Any form of nest not shown, may be arranged within the nesting section 12 upon the floor 19 thereof.

A disk-shaped door 22 is pivotally mounted as by means of a bolt 23 to the front wall 14 at a point above and slightly at one side of the vertical radius of the entrance opening 13 being adapted to swing of its own weight downwardly in closed position over the said opening as best illustrated by dotted lines in Fig. 1 of the drawing, a buffeting stop 24 being arranged for engagement by the same at one side of the opening 13 having a rubber or other resilient engaging face 25.

An overbalanced false bottom or trip board 26 is provided in the waiting section 11 having laterally projecting rods 27 trunnioned in inwardly-extending blocks 28 carried by the trap sides 20, the under side of the false bottom 26 being cut-away as at 29 rearwardly of its trunnions 27, rendering the portions forwardly thereof of greater weight than the rear portion of the same. This overbalancing of the false bottom 26 positions the same normally tilted forwardly inclined and with the forward end thereof normally resting upon a transversely positioned tilted bottom cleat 30 while a similar cleat 31 horizontally arranged rearwardly of the cleat 30 engages the bottom 26 when rearwardly inclined, it being noted that both of said cleats 30 and 31 are slightly spaced above the engaging faces of the runners 21.

A latch 32 is provided for the door 22 having a U-shaped or crank portion 33 pivotally mounted in a bracket 34 carried by the inner face of the front wall 14 said latch having an inwardly and downwardly-extending angular arm 35 provided with a terminal engaging finger 36 adapted to normally engage the inner face of the wall 14 by reason of the weight of the said arm 35 when the door 22 is either in its open or its closed position.

A vertically arranged slide bar 37 is shiftably mounted in staples 38 carried by the side boards 20 and 20' at the right hand side of the device, an inwardly projecting foot 39 upon the lower end of the slot bar 37 normally resting of its own weight upon the adjacent forward corner portion of the false bottom 26, the weight of the said bar assisting in maintaining the false bottom in its forwardly inclined normal position. An eye or loop 40 is mounted upon the top of the bar 37 having the slightly upwardly curved free end 41 of the latch 32 freely extending therethrough. The bottom 26 being of less dimensions than the waiting section 11 provides an open space between the edges thereof and the adjacent walls of the trap for allowing any litter to be readily removed therethrough.

From this detailed description of the invention the complete operation thereof will be at once apparent, it being understood that with the door 22 elevated as shown in Fig. 1 of the drawings, the entrance opening 13 will readily allow a hen to enter the waiting section 11, the trap being in its set position with the latch finger 36 positioned beneath the lower edge of the door 22 in contact with the front wall 14. The hen entering the opening 13 steps upon the false bottom 26, and when the hen's body is partially within the opening, the hen passes over the pivotal axis of the bottom 26 forcing the latter to tilt rearwardly, elevating the slide 37 and swinging the latch 32 upon its pivot carrying the arm 35 inwardly as well as the finger 36 to their dotted line positions as shown in Fig. 2, thus releasing the door 22 which by reason of its own weight, drops against the incoming hen, thus preventing more than one hen from entering the opening 13. The door 22 is extremely light in weight preventing any damage to the fowl's plumage and after the bird passes inwardly away from the door 22, the latter drops into its closing position over the opening 13 in abutting engagement with the stop 24. As soon as the hen steps off of the rear portion of the false bottom 26, by passing into the nesting section 12 over the partition member 15, the false bottom again returns to its forwardly inclining position upon the cleat support 30 and the bar 37 drops of its own weight upon the same, bringing the latch 32 assisted by the weight of the latter to its normal position with the finger 36 engaging the side 14 outwardly of the door 22, thereby locking the door in its closed position until released by an attendant.

A trap nest is thus arranged which can only receive a single hen and which when sprung prevents a fowl from opening the door 22 while the attendant may readily release the latch 32 and reset the trap by elevating the door 22 into its caught position above the latch arm finger 36.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A trap nest comprising an elongated casing having the sides thereof downwardly extending forming side runners and being further provided with an entrance opening of substantially the size of a hen in the front wall thereof, the said wall being slightly spaced at its top from the top member of the casing, a disk-shaped door of light weight pivoted inwardly of the said wall above the said opening and at one side of the vertical radius thereof, transverse supporting cleats arranged in the open bottom of the said casing, the forward one of said cleats being forwardly inclined and positioned slightly spaced from the said front wall, an overbalanced trip board trunnioned in the said casing having a rear underneath cut-away portion and being normally inclined in flat engagement with the said forward cleat and in substantial flat engagement with the rearward cleat during the operation thereof, a supporting and locking latch for the said door, and operating means for the said latch seated upon the forward corner of the said trip board.

2. A trap nest comprising an elongated casing having the sides thereof downwardly extending forming side runners and being further provided with an entrance opening of substantially the size of a hen in the front wall thereof, the said wall being slightly spaced at its top from the top member of the casing, a disk-shaped door of light weight pivoted inwardly of the said wall above the said opening and at one side of the vertical radius thereof, a cushioned stop for the said door positioned at one side of the said opening in the closing path of movement of the door, a transversely arranged centrally positioned combined partition strip and handle carried by the said casing, transverse supporting cleats arranged in the open bottom of the said casing, the forward one of said cleats being forwardly inclined and positioned slightly spaced from the said front wall, an overbalanced trip board trunnioned in the said casing having a rear underneath cut-away portion and being normally forwardly inclined in flat engagement with the said forward cleat and in substantial flat engagement with the rearward cleat during the operation thereof, a supporting and locking latch for the said door, and operating means for the said latch seated upon the forward corner of the said trip board.

3. A trap nest comprising an elongated casing having the sides thereof downwardly extending forming side runners and being further provided with an entrance opening of substantially the size of a hen in the front wall thereof, the said wall being slightly spaced at its top from the top member of the casing, a disk-shaped door of light weight pivoted inwardly of the said wall above the said opening and at one side of the vertical radius thereof, transverse supporting cleats arranged in the open bottom of the said casing, the forward one of said cleats being forwardly inclined and positioned slightly spaced from the said front wall, an overbalanced trip board trunnioned in the said casing having a rear underneath cut-away portion and being normally inclined in flat engagement with the said forward cleat and in substantial flat engagement with the rearward cleat during the operation thereof, a latch having a U-shaped portion pivoted to the said front wall adjacent the upper edge thereof and having one slightly upturned free end, the other end portion of said latch being angularly bent forming a down-turned arm terminating in a forwardly projecting finger in normal contact with the inner face of the said wall adjacent the upper edge of said door when the latter is in its closed position, the space between the said finger, arm and U-shaped portion of the latch being of sufficient size to accommodate the said door when in its open position above the said finger, and an L-shaped slide vertically freely positioned upon the said trip board having a loose connection at its upper end with the said upturned free end of the latch.

4. A trap nest comprising an elongated casing having the sides thereof downwardly extending forming side runners and being further provided with an entrance opening of substantially the size of a hen in the front wall thereof, the said wall being slightly spaced at its top from the top member of the casing, a disk-shaped door of light weight pivoted inwardly of the said wall above the said opening and at one side of the vertical radius thereof, a cushioned stop for the said door positioned at one side of the said opening in the path of closing movement of the door, a transversely arranged centrally positioned combined partition strip and handle carried by the said casing, transverse supporting cleats arranged in the open bottom of the said casing, the forward one of said cleats being forwardly inclined and positioned slightly spaced from the said front wall, an overbalanced trip board trunnioned in the said casing having a rear underneath cut-away portion and being normally forwardly inclined in flat engagement with the said forward cleat and in substantial flat engagement with the rearward cleat during the operation thereof, a latch having a U-shaped portion pivoted to the said front wall adjacent the upper edge thereof and having one slightly upturned free end, the other end portion of said latch being angularly bent forming a down-turned arm terminating in a forwardly projecting finger in normal contact with the inner face of the said wall adjacent the upper edge of said door when the latter is in its closed position, the space between the said finger, arm and U-shaped portion of the latch being of sufficient size to accommodate the said door when in its open position above the said finger, and an L-shaped slide vertically freely positioned upon the said trip board having a loose connection at its upper end with the said upturned free end of the latch.

In testimony whereof I affix my signature.

IRVING C. LEWIS.

Copies of this patent may be obtained for five cents each, by addressing the "Commissioner of Patents, Washington, D. C."